Nov. 10, 1970  B. GROLMAN ET AL  3,538,754
METHOD FOR MEASURING INTRAOCULAR PRESSURE
Original Filed Oct. 4, 1963  5 Sheets-Sheet 2
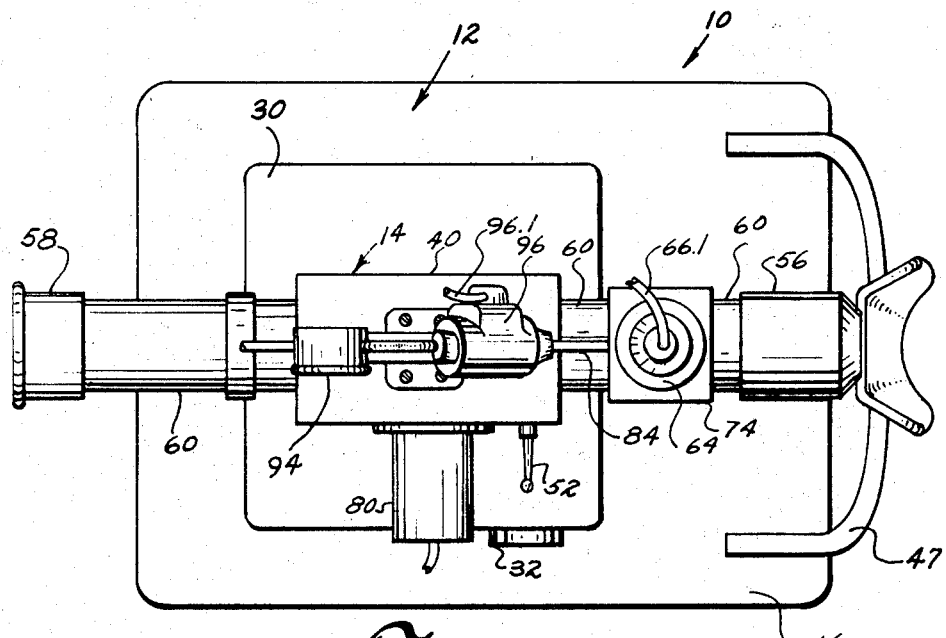
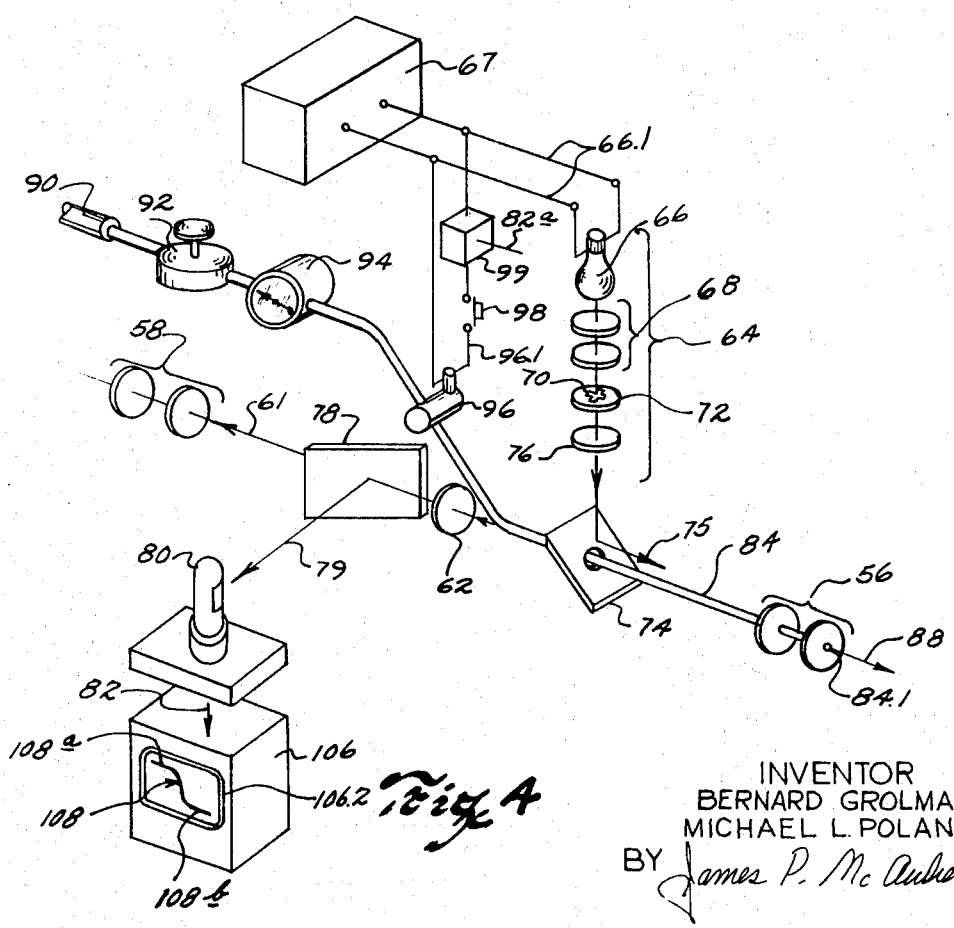
INVENTOR
BERNARD GROLMAN
MICHAEL L. POLANYI
BY James P. McAndrews
ATTORNEY INVENTOR
BERNARD GROLMAN
MICHAEL L. POLANYI
BY James P. McAndrew
ATTORNEY INVENTOR
BERNARD GROLMAN
MICHAEL L. POLANYI
BY James P. McAndrew
ATTORNEY

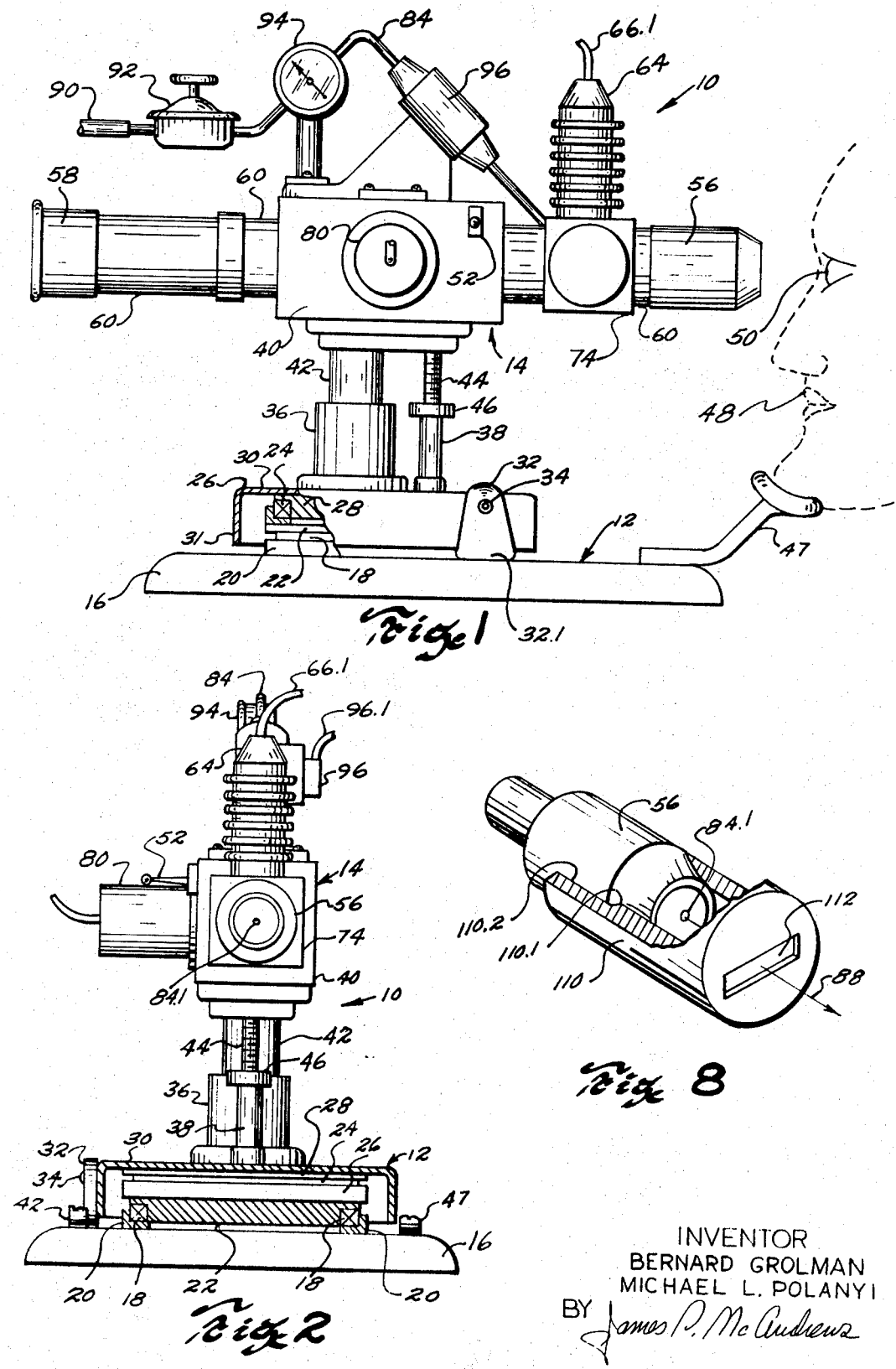

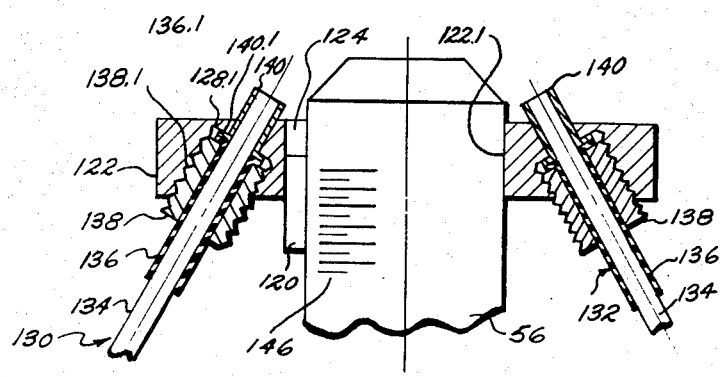
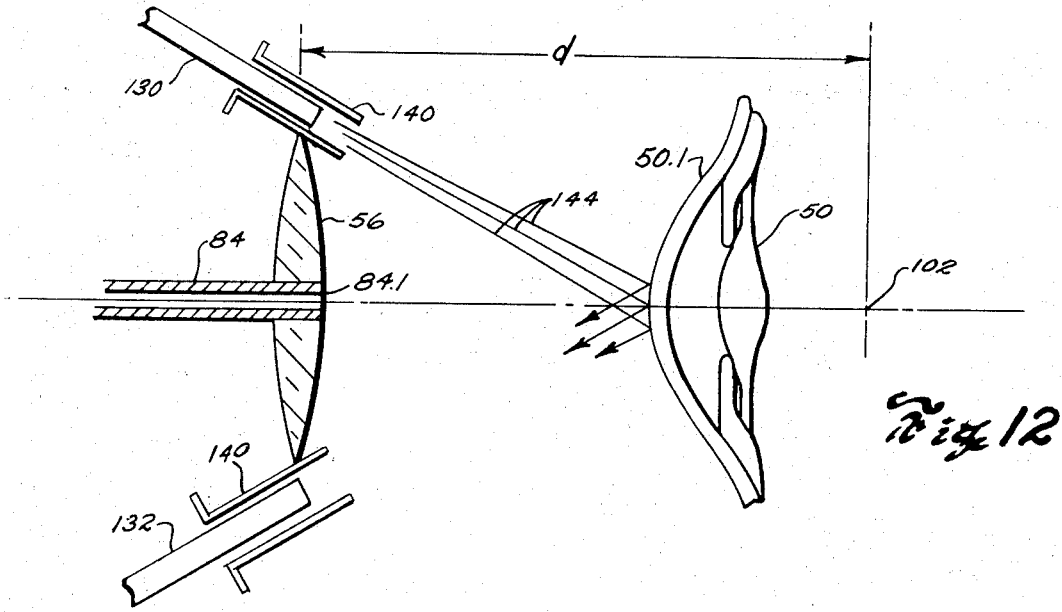
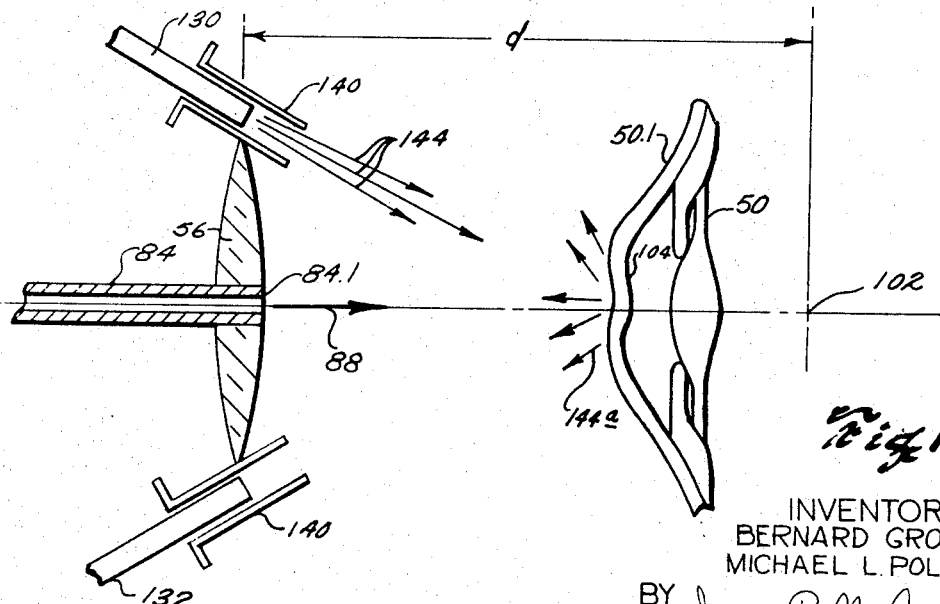

United States Patent Office 3,538,754
Patented Nov. 10, 1970

3,538,754
METHOD FOR MEASURING INTRAOCULAR PRESSURE
Bernard Grolman, Worcester, and Michael L. Polanyi, Webster, Mass., assignors, by mesne assignments, to American Optical Company, Southbridge, Mass., a voluntary association of Massachusetts
Continuation of application Ser. No. 313,804, Oct. 4, 1963. This application Jan. 15, 1969, Ser. No. 802,713
Int. Cl. A61b 3/16
U.S. Cl. 73—80                             2 Claims

ABSTRACT OF THE DISCLOSURE

A tonometer having a source of fluid for projection against a patient's eye. The fluid source is positioned in front of the eye by focusing a light source at the center of curvature of the corneal surface. The amount of light reflected from the eye while it is distorted by the fluid is a measure of the intraocular pressure.

---

This application is a continuation of application Ser. No. 313,804 filed on Oct. 4, 1963 and now abandoned.

The field of this invention is that of tonometer devices and the invention relates, more particularly, to a novel and improved method for determining the "tone" or intraocular pressure of the human eye without requiring any solid contact with the eye.

The importance of detecting glaucoma and other pathological eye disorders in incipient stages by measurement of fluid pressures within the eye is becoming increasingly evident. However, all of the devices presently known in the art for measuring intraocular pressure can accomplish this result only by contacting the eye with a rigid member for identing or flattening the eye against its internal fluid pressures. These devices are inconvenient and inaccurate and their use can cause a patient considerable discomfort. Generally, the use of these devices also requires immobilization of the eye by means of anesthetics which can be administered only by qualified medical practitioners. As a result, measurements of intraocular pressure are not regularly made even though there would be ample opportunity for such measurements during regular refractive eye examinations if such pressures could be conveniently determined.

It is an object of this invention to provide a novel and improved method for determining the intraocular pressures of the human eye; to provide such method by which intraocular pressures can be determined without requiring contacting of the eye with any solid object; and to provide such method by which intraocular pressures can be determined with convenience and accuracy. It is a further object of this invention to provide a method for performing tonometry without requiring the administration of anesthetics for immobilizing the eye; to provide such method for performing tonometry without causing patient discomfort; and to provide such method which can be utilized by persons other than skilled medical practitioners.

It is an important object of this invention to provide a method for determining intraocular pressure with such convenience and economy and with such accuracy that they can be routinely employed as part of regular refractive eye examinations and the like. It is a further object of this invention to provide such method which can be employed repeatedly without patient discomfort for detecting variations in the intraocular pressure of a subject eye.

It is still another object of this invention to provide a tonometer, including a source for projecting a stream of fluid against a patient's eye and a mechanism for measuring reflected light from the eye, in which the fluid stream source is positioned by focusing light at the center of curvature of the cornea of the patient's eye.

Briefly described, a method of tonometry provided by this invention comprises the steps of projecting a stream of fluid onto an eye with selected force from a position spaced from the eye for distorting the eye to an extent proportional to its intraocular pressure, and optically detecting or gauging the extent of said eye distortion from a position spaced from the eye as an indication of the intraocular pressure. In a preferred method, according to this invention, light is directed onto the eye to be reflected from the eye toward a selected station. A stream of fluid, preferably a gas such as air, is then projected onto the eye with selected force from a position spaced from the eye for distorting the eye to an extent proportional to its intraocular pressure and for concomitantly modulating the light reflected from the distorted eye surface toward the station in accordance with the extent of the distortion. The reflected light received at the selected station can then be gauged as an indication of the intraocular pressure of the eye. The source of the fluid stream is properly positioned in front of the eye by focusing light (from a light source fixed relative to the position of the fluid stream source) at the center of curvature of the cornea of the eye. This permits sharp focusing and critical control of alignment.

The tonometer apparatus provided by this invention comprises means spaced from an eye projecting a stream of fluid onto the eye with selected force for distorting the eye against its intraocular pressures, and optical means also spaced from the eye gauging the extent of said eye distortion for determining the intraocular pressure of the eye. In a preferred tonometer apparatus according to this invention, means direct light onto an eye so that the light can be reflected from the eye toward a selected station; means spaced from the eye project a stream of fluid onto the eye with selected force for distorting the eye to an extent proportional to its intraocular pressure and for concomitantly modulating light reflected toward the selected station in accordance with the extent of said eye distortion; and photo-electric means respond to reflected light received at the selected station for providing an electrical signal which is modulated in accordance with the intraocular pressure of the eye. Preferably, the apparatus also includes display means responsive to the electrical signal provided by the photo-electric means for recording or indicating the intraocular pressure.

In a preferred tonometer apparatus provided by this invention, lens means or microscope means are mounted for movement to be focused on an eye. The apparatus can also include means directing light onto the eye to be reflected therefrom toward a selected light-gauging station. Means forming a passage having an open end are then mounted for movement with the lens or microscope means and are adapted for disposing the open passage end in a selected spaced relation to an eye when the lens or microscope means are focused upon the eye in a selected manner. The apparatus further includes means projecting a stream of fluid with selected force from the open passage end onto the eye for distorting the eye to an extent proportional to its intraocular pressure and for concomitantly modulating the light reflected from said eye toward said light-gauging station. Means responsive to said reflected light are then arranged at said light-gauging station for gauging the intraocular pressure of the eye by reference to the amount of said reflected light received at said light-gauging station.

Many other objects and advantages and many other features and details of the novel and improved methods and apparatus for determining intraocular pressures as provided by this invention appear in the following detailed description of preferred embodiments of the invention, the detailed description referring to the drawing in which:

FIG. 1 is a side elevation view of a tonometer apparatus provided by this invention;

FIG. 2 is an end elevational of the tonometer apparatus of FIG. 1;

FIG. 3 is a plan view of the tonometer apparatus of FIG. 1;

FIG. 4 is a diagrammatic view illustrating the methods and apparatus of this invention;

Figure 5:
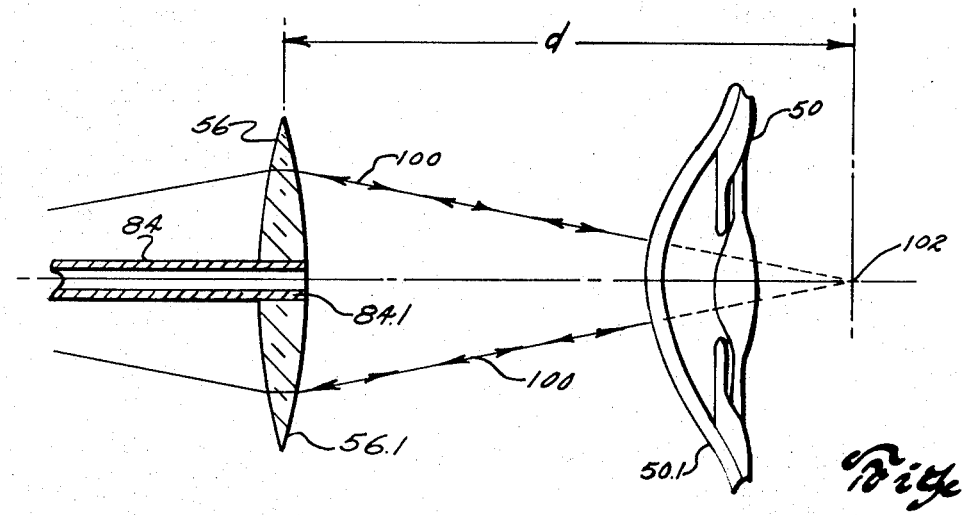
Figure 6:
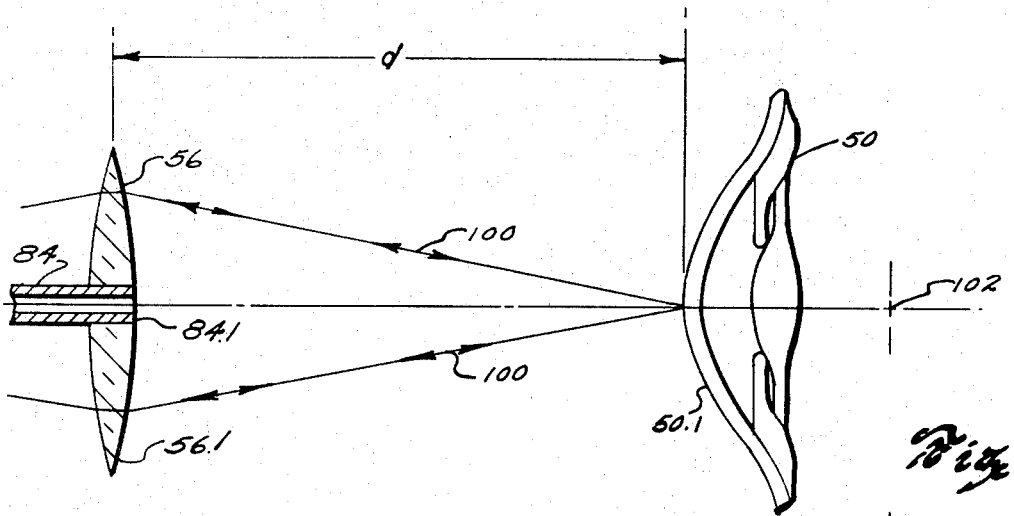
Figure 7:
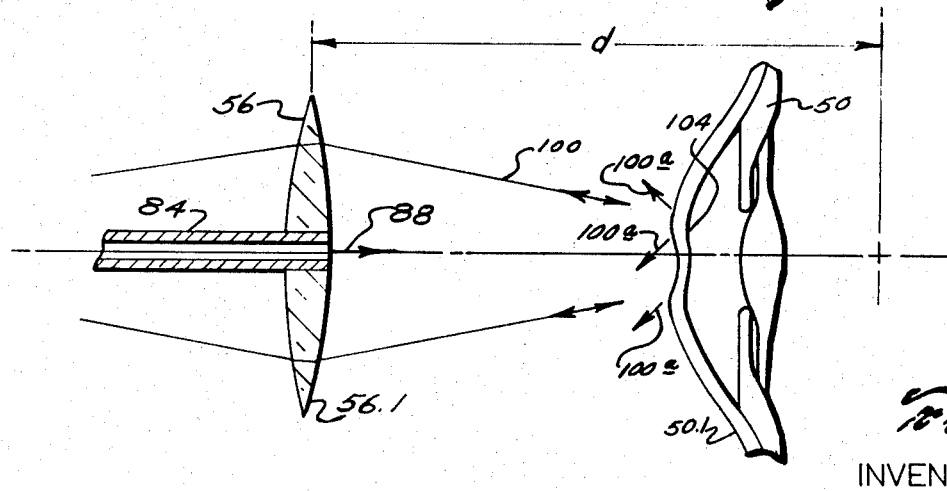

FIGS. 5-7 inclusive, are diagrammatic views illustrating the methods and apparatus provided by this invention;

FIG. 8 is a partial perspective view partially in section illustrating an alternative embodiment of the apparatus of this invention.

Figure 9:
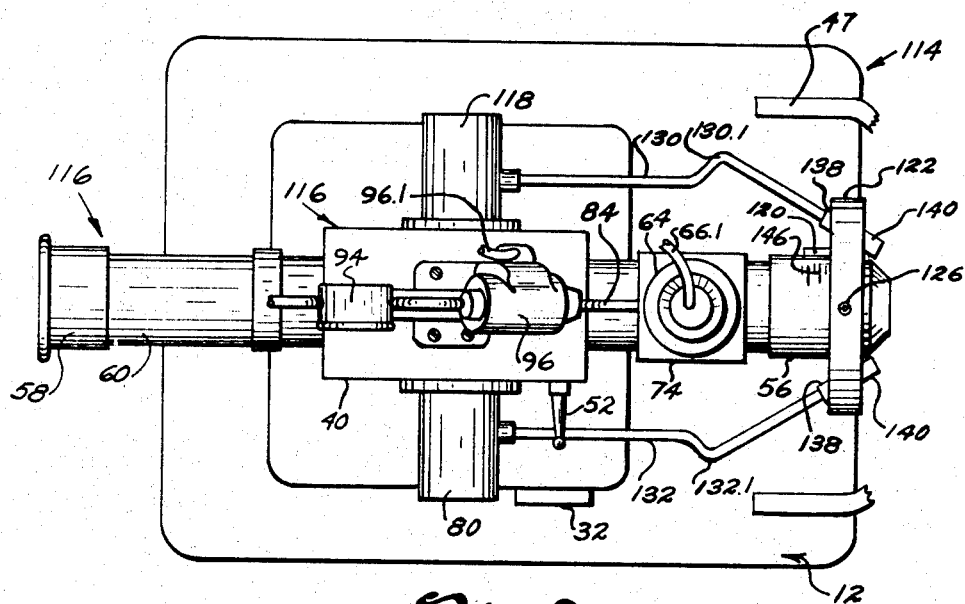

FIG. 9 is a plan view of another alternative embodiment of the tonometer apparatus provided by this invention.

Figure 10:
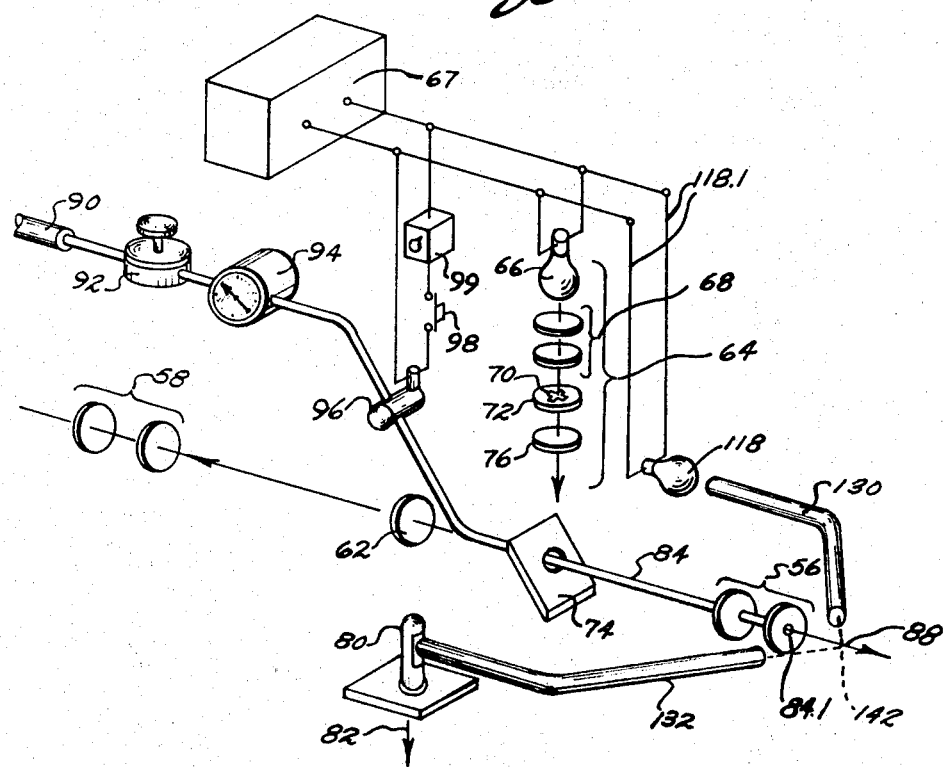

FIG. 10 is a diagrammatic view similar to FIG. 4 illustrating the operation and function of the apparatus shown in FIG. 9;

FIG. 11 is an enlarged partial plan view of the objective means embodied in the apparatus of FIG. 9, the collar and related members mounted on said objective means being shown in section; and FIGS. 12 and 13 are diagrammatic views similar to FIGS. 5 and 7 respectively illustrating operation of the apparatus of FIG. 9.

Referring to the drawing, 10 in FIGS. 1-3 indicates the novel and improved tonometer apparatus provided by this invention which is shown to include a base portion 12 and a body portion 14. As the primary function of the base portion is to provide support for the body portion 14 and to permit movement of the body portion in any direction, the base portion 12 of the apparatus will be first described herein.

As illustrated, the base portion 12 can include base plate 16 and can have bearing members 18 mounted in suitable races 20 which are fixedly secured to the base plate. An intermediate plate 22 can be mounted upon the bearings 18 and can be adapted for movement back and forth on the bearings 18 in a direction parallel to the longitudinal axis of the body portion of the apparatus. The intermediate plate 22, in turn, can support bearings 24 in suitable races 26 which are fixedly secured to the intermediate plate. A top plate 28 can then be mounted upon the bearings 24 and can be adapted for movement back and forth in a horizontal plane in a direction normal to the longitudinal axis of the apparatus body portion. A cover plate 30 can be fixed to the top plate 28 and can have a depending flange 31 substantially enclosing the bearing and race members of the base portion 12. Preferably, a brake member 32 of hard rubber, plastic or similar material can be pivotally mounted as at 34 upon the cover plate 30 and can be pivoted so that one end 32.1 thereof can exert a frictional dragging force upon the base plate 16 when desired. In this construction, the cover plate 30 can be moved in any direction in a horizontal plane and can be set to remain in any selected position relative to the base plate by action of the brake member 32.

To provide for movement of the body portion 14 of the apparatus in a vertical direction, a hollow bushing or sleeve 36 of relatively large inside diameter can be fixedly mounted upon the cover plate 30. A similar hollow bushing or sleeve 38, which can be of relatively smaller inside diameter, can also be fixedly mounted upon the cover plate 30. In this arrangement, the body portion 14 of the apparatus can include a main or central block 40 and can have a supporting shaft 42 extending downwardly therefrom to be received with a close sliding fit within the bushing 36. A threaded adjusting stud 44 can also be fixedly mounted upon the main body block 40 and can extend downwardly therefrom to be received with substantial clearance within the bushing 38. A nut 46 threadedly engaged upon the stud 44 can then be abutted with the top of the sleeve 38 for limiting the extent to which the shaft 42 and the stud 44 can slide or extend into their respective bushings. In this construction, the supporting shaft 42 of the apparatus can slide in the bushing 36 for raising or lowering the body portion 14 to a desired elevation relative to the base portion of the apparatus. The nut 46 can then be rotated on the stud 44 into abutting engagement with the top of the bushing 38 for locking the location of the body portion at the desired elevation above the base portion. It should be understood that the base portion 12 and associated apparatus thus far described have been set forth in some detail by way of illustration without intention of limiting the scope of this invention to the precise structure shown. In accordance with this invention, any suitable means can be employed for supporting the apparatus body portion which will permit controlled movement of the body portion 14 in any direction.

In a preferred embodiment of the tonometer device 10, patient-positioning means such as the chin rest 47 shown in FIGS. 1-3 can be mounted on the base plate 16. A patient whose intra-ocular pressures are to be determined with the apparatus can position his head relative to the apparatus base portion by means of the chin rest as is indicated at 48 in FIG. 1, thereby to position his eye 50 in a fixed location relative to the base portion. If desired, a sighting member 52 can be attached to the apparatus 10 and the patient can fix his eyes on the sighting member for holding his eyes relatively immobile during operation of the tonometer apparatus. It should be understood that the patient-positioning means 47 and sighting means 52 have been illustrated by way of example only and that many other positioning or sighting means of conventional type could be employed in the manner described within the scope of this invention.

In accordance with this invention, the apparatus body portion 14 can include an objective lens means 56 and an ocular means 58 which can be fixed in spaced relation to each other by tube means 60 in the manner of a conventional microscope. That is, the objective lens means can be adapted to be focused upon an object spaced at a selected distance $d$ in front of the objective lens means for directing light from the object toward the ocular means 58 as indicated in FIG. 4 by the arrow 61 and for forming a light image of the object in a selected image plane adjacent the ocular means. The ocular means can be held in fixed position relative to said image plane by the tube means to view the image formed in said image plane and to verify that the objective lens means has been properly focused on the object spaced at the distance $d$. In a desirable embodiment, the objective can have a focal length and a spacing from the ocular means such that the objective can be focused on an object spaced therefrom at a distance $d$ on the order of fifteen (15) millimeters. As shown in FIGS. 1-3, the tube means 60 can fixedly mount the objective 56 and the ocular 58 in the desired relation to each other upon the main or central block 40 of the apparatus body portion so that they can be moved in any direction as an integral unit with the block 40. The objective and ocular means have each been diagrammatically illustrated in FIG. 4 as embodying a pair of spaced lens elements but it should be understood that objectives and oculars of any conventional type could be employed in the manner shown within the scope of this invention. Further, a telescope lens 62 or the like can be associated with the objective and ocular in conventional manner for regulating the tube length of the apparatus body portion 14.

As above described, the object plane spaced at the selected distance $d$ in front of the objective 56 and the image plane viewed by the ocular 58 form one pair of conjugate focal planes of the objective. In a preferred embodiment of this invention, an illuminated target can be disposed relative to the objective to fall within another plane which is also conjugate with the plane spaced in front of the objective, whereby the objective can form a light image of the target in space at the same selected distance $d$ in front of the objective. Such an illuminated target means, indicated generally at 64 in FIGS. 1–4, can be of conventional design. For example, the target means can include a filament lamp 66 or other suitable light source which can be connected to any conventional power source 67 by leads 66.1 as shown particularly in FIG. 4. The target means can also embody conventional condenser lens means 68 which can image the light source 66 upon a target formed by a small cross-shaped aperture 70 or the like in the light stop 72, thereby to illuminate the target 70. A beam-splitter means, preferably comprising a conventional partially-transmitting partially-reflecting half-silvered mirror 74, can then be interposed between the objective 56 and the ocular 58. The mirror can transmit sufficient light therethrough as indicated by the arrow 61 so that the objective 56 can form light images to be viewed through the ocular means 58 as previously described. The mirror can also be arranged relative to the illuminated target 70 for reflecting light from the target into the objective as indicated by the arrow-headed line 75 so that the objective can form an image of the target at the distance $d$ in front of the objective as has also been previously described. If desired, a telescope lens 76 or the like can be associated with the objective for regulating the physical spacing of the target 70 from the objective in conventional manner.

In a practical embodiment of this invention, another beam-splitter means, also preferably comprising a partially-transmitting partially-reflecting half-silvered mirror 78, can be interposed between the objective and ocular for receiving light from the objective and for reflecting a representative part of said light to a light-gauging station as indicated by the arrow-headed line 79. Preferably, the mirror 78 can be physically mounted within the block 40 in any conventional manner (not shown). A photosensitive means such as the conventional photoelectric cell 80 can be arranged at said light-gauging station for receiving light which is reflected from the mirror means 78. Most advantageously, the photoelectric cell can be arranged in a plane which is conjugate with the noted object plane located at the distance $d$ in front of the objective, whereby, when properly focused on an object spaced at the distance $d$, the objective can reflect light from the mirror 78 to form a light image of the object on the photoelectric cell. The operation of the photocell 80 can be completely conventional. Accordingly, it will be sufficient description of its function in the apparatus 10 to state herein that the photocell 80 can be responsive to the light 79 directed thereon for providing an electrical signal indicated at 82 in FIG. 4, which is precisely modulated in accordance with the intensity of the light incident on the photocell.

As illustrated in the drawings, a conduit or passage-forming means 84 having an open end 84.1 can be mounted upon the apparatus body portion 14 and can have its open end 84.1 secured in fixed relation to the objective lens means 56 for movement with the objective lens means. The conduit is preferably somewhat rigid or shape-retaining at its open end 84.1 and is therefore preferably formed of a relatively stiff plastic or metallic tubing or the like. The open passage end 84.1 is preferably disposed closely adjacent to the objective 56 and in a preferred construction, the passage-forming means can extend directly through the objective lens means along the optical axis thereof for disposing the open passage end 84.1 at a fixed location substantially flush with the front surface 56.1 of the objective (see FIGS. 5–7). In a desirable embodiment, the open passage end 84.1 can have a diameter or transverse dimension on the order of one (1) millimeter.

In accordance with this invention, a stream of fluid, preferably a gas such as compressed air, can be projected with a carefully controlled force from the open passage end 84.1 as indicated by the arrow 88 in FIGS. 4 and 7. For accomplishing this purpose in a practical construction, a cylinder of compressed air or the like can be located remotely from the body portion 14 and can be connected to the conduit 84 by a tubing 90, only the tubing 90 being shown herein. The tubing can preferably be formed of rubber, plastic or other flexible material for permitting free movement of the apparatus body portion while the tubing is connected to the conduit 84. A pressure regulator valve 92 of conventional design can then be interposed in the conduit 84 (as shown only in FIGS. 1 and 4) together with a conventional pressure indicator 94. Another valve 96, preferably a normally closed solenoid-type valve can also be interposed in the conduit 84 and can be connected by leads 96.1 through a normally open push-button switch 98 and relay 99 or the like to the power source 67 as shown in FIG. 4. As will be understood, the air cylinder and tubing 90 can direct fluid into the passage-forming means 84 under pressure and the valve 92 and indicator 94 can be employed for regulating the fluid pressure within the conduit in conventional manner. The solenoid valve can then be actuated to open position by the switch 98 and relay 99 when desired to permit a stream of fluid 88 to pass the solenoid valve and be projected from the passage end 84.1 with a selected force as controlled by the valve 92 and indicator 94. In a desirable embodiment of this invention, the valve 92 and indicator 94 can be set for maintaining a fluid pressure at the valve 96 on the order of about twenty (20) millimeters of mercury above atmospheric pressure whereby the stream of fluid 88 can be projected from the open passage end 84.1 with a relatively light force. The above reference to the air cylinder and tubing 90 has been by way of example and of course other conventional means could be employed for directing fluid into the passage means 84. Similarly, the above reference to the indicator 94 and valve 96 has been for the purpose of illustration and other similar structure could be substituted therefor within the scope of this invention. For example, a three-way valve could be substituted for the solenoid valve 96 and could be arranged to direct a stream of fluid against a spring leaf or the like substituted for the indicator 94, thereby to indicate the flow rate of the fluid stream by reference to deflection of the leaf in conventional manner. The three-way valve could then be actuated to another valve position for permitting the stream of fluid to be projected from the open passage end 84.1 onto an eye. As will be understood, this invention can include any structure similar to that described which is adapted to project a stream of fluid with controlled force from the open passage end 84.1.

The apparatus thus far described can be employed for conveniently and accurately determining a patient's intraocular pressures in the following manner. First, the patient can arrange his head in fixed posititon on the apparatus base by means of the chin rest 47 as indicated at 48 in FIG. 1. The patient can then fix his eyes on the sighting member 52 for holding his eye 50 relatively immobile. When the patient has been posititoned relative to the apparatus base, the body portiton 14 can be adjusted on the base for arranging the body portion, and particularly the open passage end 84.1, at a selected orientation relative to the patient's eye 50.

In a preferred embodiment of this invention, the apparatus body portion 14 can be adjusted to orient the conduit end 84.1 at a normal disposition relative to the eye surface 50.1 and to space the conduit end at a known distance from said eye surface, such orientation and spacing being accomplished by reference to capabilities of the objective lens means 56 as previously described. For example, the body portion of the apparatus can be moved toward the patient's eye until the objective 56 can direct light rays 100 (see FIG. 6) from the illuminated target 70 onto the eye surface 50.1. The body portton 14 can then be adjusted forwardly so that those light rays 100 which would tend to focus on the optical axis of the objective at the distance $d$ will be directed as if focused at the center of curvature 102 of the corneal surface 50.1 as indicated in FIG. 5. Such light rays will be perpendicularly incident on the eye surface 50.1 as will be understood and can be at least partially reflected back from the eye surface into the objective 56 as indicated by the double arrowheads applied to the lines illustrating the light rays 100 in FIG. 5. When the body portion has been adjusted in this manner, the reflected light rays appear to diverge from the center of curvature 102 of the eye surface and the objective 56 refocuses said reflected light for forming a light image of the target 70 in the image plane viewed by the ocular means 58. The apparatus operator (not shown) can then verify that the objective 56 has been focused on the center of curvature 102 by viewing said target image through the ocular means. When this adjustment of the body portion 14 has been made, it will be known that the open passage end has been oriented so that its axis is pointed at the center of curvature 102 normal to the eye surface 50.1.

When the conduit end 84.1 has been oriented as above-described, the spacing of the conduit end from the eye surface 50.1 will also be known provided that the curvature of the corneal surface 50.1 is known. That is, the spacing of the conduit end 84.1 will equal the distance $d$ less the radius of curvature of the eye surface. If desired, a further axial adjustment of the body portion 14 can be made for determining the radius of curvature of the corneal surface. That is, the body portion can be moved axially away from the patient's eye until the objective 56 is focused on the eye surface 50.1 at the distance $d$ from said surface as indicated in FIG. 6. At this spacing, the objective can form a light image of the illuminated target 70 directly upon the surface and can also form a light image of the eye surface in the plane viewed by the ocular means 58. Accordingly, the apparatus operator can verify the focus of the objective on the eye surface at the distance $d$ by viewing the eye surface, together with the target image formed thereon, through the ocular 58. As will be understood, the movement of the body portion 14 required to move the focus of the objective from the center of curvature 102 to the corneal surface 50.1 will indicate the radius of curvature of the corneal surface. The body portion can then be returned to the position of adjustment shown in FIG. 5 with assurance that the passage end 84.1 has been oriented as desired and has also been spaced as desired at a known distance from the eye surface 50.1.

When the passage end 84.1 has been properly spaced and oriented relative to the patient's eye, the solenoid valve 96 can be actuated to open position by the pushbutton 98 and relay 99, thereby to permit a stream of compressed air or other fluid 88 to pass the solenoid valve and be projected from the passage end 84.1 with a selected force as controlled by the setting of the regulator valve 92. This stream of fluid can exert a force upon the patient's eye to cause deformation or distortion of the eye surface 50.1 as indicated at 104 in FIG. 7. The extent of this surface distortion will of course be dependent upon the force with which the stream of fluid 88 is projected from the passage end and upon the spacing and orientation of the passage end from the eye surface, these factors being controlled by the apparatus operator. The extent of the eye surface distortion will also be dependent upon the firmness or "tone" of the eye as determined by its intraocular or internal fluid pressure as will be understood. Accordingly, where the other noted factors are controlled by the apparatus operator as above described, the extent of the eye surface distortion 104 can be primarily dependent upon and proportional to the intraocular pressure of the eye 50.

It has previously been noted that the objective 56 can direct light rays 100 from the illuminated target 70 onto the eye surface 50.1. As described, these light rays are focused toward the center of curvature 102 of the eye surface and therefore are reflected back from the eye surface and refocused by the objective for reproducing the target image in a plane viewed by the ocular 58 as indicated by the arrow 61. Further, a representative part of the reflected light refocused by the objective can be intercepted by and reflected from the mirror 78 for forming another light image of the target 70 on the photocell 80. When the fluid stream 88 is directed onto the patient's eye as above described, the resulting surface distortion 104 can substantially change the pattern of light reflection from the eye surface 50.1. In particular, some light rays 100 which had been reflected back from the eye surface into the objective 56 to be refocused on the photocell 80 can be randomly reflected as shown at 100a in FIG. 7 so that they cannot be refocused on the photocell. The amount of light which is randomly scattered and not refocused on the photocell in this manner is proportional to the extent of the surface distortion 104 and is therefore proportional to the intraocular pressure upon which the extent of said surface distortion primarily depends. This means that the electrical signal 82 which is provided by the photocell in accordance with the light incident thereon will also be modulated in accordance with the intraocular pressure of the patient's eye. In this way, the apparatus 10 can provide a signal 82 which can be very precisely modulated in accordance with a patient's intraocular pressure.

If desired, a recording or display device of any conventional type can be arranged for receiving the signal 82 and for providing a suitable record or display of the modulations of the signal. Preferably, the device can embody a conventional oscilloscope 106 as shown in FIG 4 and can be adapted in well-known manner for displaying a trace 108 on the oscilloscope screen 106.1 at levels corresponding to modulations of the signal. For example, oscilloscope can be set to display a relatively strong signal 82 at a high level on the screen as shown at 108a in FIG. 4 and to display a weaker signal 82 at the lower level indicated at 108b. Of course other meter devices or the like could be arranged to receive the signal 82 and to graphically indicate modulations of the signal. In addition, or alternatively, conventional tape or stylus recording devices or the like could be arranged in well-known manner for directly recording modulations of the signal 82. It should be understood that when reference is made to display devices herein, this reference should also be taken to include recording devices and the like. If desired, the recording or display device adapted to receive the signal 82 can be calibrated in terms of intraocular pressures as will be understood so that the record or display provided by the device can be read directly to indicate a patient's intraocular pressure. For example, the oscilloscope 106 can be adapted in well-known manner to display trace portions corresponding to modulations of the signal 82 immediately before and concurrently with projection of the fluid stream 88 onto the patient's eye as indicated in FIG. 4 by the trace portions 108a and 108b respectively. The oscilloscope screen 106.1 can then be calibrated to permit reading the difference in these trace levels in terms of intraocular pressure.

The amount of light reflected back from the eye surface 50.1 onto the photocell 80, and, therefore, the signal 82 provided by the photocell, can vary in accordance with the orientation of the objective 56 relative to the eye. For example, the amount of this light can be at a maximum only when the optical axis of the objective is oriented exactly normal to the eye surface in the manner previously described. On the other hand, the patient's eye 50 will be subject to rapid involuntary motions so that the noted orientation of the objective and eye cannot be maintained for any set period of time. In order to make an accurate determination of the intraocular pressure of the eye 50, it is desirable to direct the stream of fluid 88 onto the eye and to direct modulations of the signal 82 only while the objective and eye have a selected orientation relative to each other, thereby to avoid any fluctuations of the signal 82 which may be due only to motion of the patient's eye. For accomplishing this purpose in a practical structure, the relay 99 can be adapted in conventional manner to permit operation of the solenoid valve 96 only when the objective and eye have a selected orientation. For example, the maximum signal 82 provided by the photocell 80 can be determined by observation when the objective 56 is oriented with its optical axis normal to the eye surface 50.1. The relay can then be arranged to respond to the signal 82 as is diagrammatically indicated by the arrow 82a in FIG. 4 and can be set to actuate the solenoid valve 96 after closing of the switch 98 only when the signal 82 is at a maximum. In this arrangement, the apparatus operator can properly orient the objective 56 with a patient's eye in the manner previously described and can set the relay 99. The button 98 can then be depressed. If the patient's eye has not moved so that the objective and eye are still properly oriented, the relay 99 can permit the solenoid valve 96 to open as will be understood. However, if the patient's eye has moved, the relay 99 can prevent opening of the solenoid valve until the maximum signal 82 is again achieved when the patient's eye and objective 56 again return to the desired orientation relative to each other.

An alternative embodiment of the apparatus of this invention is shown in FIG. 8. In this regard it will be noted that the apparatus previously described with reference to FIGS. 1-7 is adapted to be focused at the center of curvature of a patient's cornea. Where the patient's corneal surface is substantially spherical, the corneal surface will have only one center of curvature and proper focusing of the apparatus can be easily accomplished. However, where the patient's eye is astigmatic so that curvature of his cornea is different along different meridians, the patient's eye surface will have more than one center of curvature. As the objective 56 can be focused on only one such center of curvature, the light rays 100 will be reflected directly back from the eye surface 50.1 in the manner previously described only along one meridian of the eye surface as will be understood. This lack of uniformity of light reflection along different meridians of the cornea can adversely effect the accuracy of measurements of intraocular pressure in the astigmatic eye to at least a slight extent. Accordingly, it is desirable in such cases to restrict the reflection of light from the surface of such an eye so that the light is reflected from a portion of the eye surface along substantially a single selected meridian of the surface. Preferably, the meridian of the eye surface from which the light is reflected can be that meridian which is of greatest radius of curvature.

In a preferred embodiment of this invention as shown in FIG. 8, a cap 110 can be fitted over the objective 56 of the apparatus 10 previously described. This cap can have a slit-shaped aperture 112 forming a field stop for the objective 56, thereby to limit the light which can fall on a patient's eye through the aperture 112 to substantially a single meridian of the surface of the eye. Preferably the cap can have a shoulder portion 110.1 abutting the end of the objective 56 for properly spacing the aperture from the objective. Most advantageously, the cap can have a pinch fit on the objective 56 as at 110.2 so that the cap can be rotated on the objective to orient the aperture 112 along a selected meridian of the patient's eye and so that the cap can remain in said orientation as long as desired. Of course, the aperture 112 should be aligned with the open passage end 84.1 for permitting the fluid stream 88 to be projected through the aperture onto a patient's eye in the manner above described. It should be understood that the field stop means described by reference to the cap 110 is merely one way by which light directed onto a patient's eye can be restricted to a single meridian of the patient's cornea. Other structures could also be employed for accomplishing this purpose within the scope of this invention.

Another alternative embodiment of the apparatus of this invention is illustrated in FIGS. 9-13 inclusive. As this alternative apparatus 114 is similar in many respects to the apparatus 10 previously described with reference to FIGS. 1-7, components of the alternative apparatus which substantially correspond to components of the apparatus 10 will be identified in FIGS. 9-13 by the same numerals. It will be then understood that the function of apparatus components bearing the same numerals will be the same in each apparatus. For example, as shown in the drawings, the alternative apparatus 114 can include a base portion 12 corresponding to the base portion 12 described with reference to FIGS. 1-7, this base portion being adapted to mount the body portion 116 of the apparatus 114 for movement in any direction.

In accordance with this invention as shown in FIGS. 9 and 10, the body portion 116 can include an objective 56 and an ocular 58 which can be fixed in spaced relation to each other by tube means 60. The objective can be adapted to be focused upon an object spaced at a selected distance d in front of the objective for forming a light image of the object in a selected image plane to be viewed through the ocular. An illuminated target means 64, including a lamp 66, condenser means 68 and a target 70 and the like, can also be disposed relative to the objective 56 so that the objective can form a light image of the target 70 in space at the distance d in front of the objective in the manner previously described with reference to FIGS 1-7.

As shown particularly in FIG. 10, the apparatus 114 can also include a conduit or passage-forming means 84 having an open end 84.1 secured in fixed relation to the objective 56. Means indicated by the tubing 90 can then be connected to the conduit 84 for directing fluid into the conduit under pressure, and regulator valve means 92 and pressure indicating means 94 can be interposed in the conduit for controlling the fluid pressure within the conduit. A normally closed solenoid valve 96 can also be interposed in the conduit 84. The valve 96 can be connected through a normally open switch 98 and relay 99 to a power source 67 and can be actuated to open valve position by the switch and relay for permitting a stream of air or other fluid 88 to pass the solenoid valve and be projected from the passage end 84.1 with selected force.

The apparatus 114 can further include a light source such as the filament lamp 118 connected by leads 118.1 to the power source 67. A photocell 80 of conventional design can also be embodied in the apparatus. Preferably but not necessarily the light source 118 and photocell 80 can be mounted on the apparatus body portion 116 for movement therewith.

In accordance with this invention, key means 120 can be secured to the objective 56 in any conventional manner and a collar 122 can be fitted around the objective as shown particularly in FIGS. 9 and 11. The collar can have a keyway 124 accommodating the key and can have a sliding fit at 122.1 for permitting the collar to slide axially on the objective without permitting the collar to rotate on the objective. A set screw means 126 can be provided for locking the collar at any selected position of axial adjustment on the objective.

The collar 122 can have two apertures 128 therein, and light-conducting optical fiber means 130 and 132 can be secured within said apertures. In a practical construction, each optical fiber means can include at least one flexible light-conducting optical fiber 134 which can be covered with a protective sheath 136 of rubber, plastic or similarly flexible material. Each fiber can have a core part of light-transmitting material of relatively high index of refraction and a cladding part of light-transmitting material of relatively low index of refraction (not shown) and can be adapted to conduct light from end to end therethrough in accordance with well-known principles of total internal reflection. Each optical fiber means 130 and 132 can extend into a collar aperture and a flange portion 136.1 of its sheath can be abutted upon an aperture shoulder 128.1. The sheath flange can then be clamped in the aperture by a bushing 138 threadedly engaged in the aperture as at 138.1. Desirably, a bushing 140 can have a flange portion 140.1 clamped in each collar aperture and can extend from each aperture as shown in FIG. 11. The collar apertures can be oriented so that the axes of the bushings 140 and fibers means 130 and 132 mounted therein can intersect each other at a point 142 on the optical axis of the objective 56. See FIG. 10. The optical fiber means 130 and 132 can be mounted in a similar manner at their opposite ends relative to the light source 118 and the photocell 80 respectively.

In this construction, the body portion 116 of the apparatus 114 can be oriented relative to the patient's eye 50 in the manner previously described with reference to FIGS. 1–7. That is, when the patient has positioned his head upon the rest 47, the apparatus body portion 116 can be adjusted to focus the objective 56 upon the center of curvature 102 of the patient's eye. See FIG. 12. When this has been done, the objective can direct light from the target 70 onto the eye to be reflected therefrom and can refocus said reflected light to form an image of the target 70 to be viewed through the ocular 58. The apparatus operator can then verify that the objective is focused on the center of curvature 102 by viewing said image through the ocular as previously described. In this way, the open passage end 84.1 of the apparatus 114 can be oriented in selected spaced relation to the eye surface 50.1 with the axis of the passage end disposed normal to the eye surface.

In accordance with this invention, the optical fiber means 130 can receive and conduct light from the source 118 and can project said light through the bushing 140 toward the patient's eye. As is shown diagrammatically in FIGS. 12 and 13, light projected from the fiber optical means 130 will tend to be projected in a cone as indicated by the light rays 144 but the bushing 140 can restrict said light so that only rays projected substantially along the axis of the bushing can reach the patient's eye. The collar 122 can then be adjusted on the objective 56 so that the light 144 can fall upon the patient's cornea at a selected location. That is, the collar 122 can be axially adjusted until the point 142 where the axes of bushings 140 intersect the optical axis of the objective 56 coincides with the corneal surface 50.1. The fiber means can be flexed as at 130.1 and 132.1 to permit said adjustment. Where the radius of curvature of the cornea is known, the adjustment of the collar can be conveniently accomplished by aligning an edge of the collar with appropriate indicia 146 marked on the objective as will be understood.

When the apparatus body portion 116 and collar 122 have been oriented relative to the patient's eye in this manner, light 144 reflected back from the eye's surface can pass through the other bushing 140 to be received within the optical fiber means 132 as illustrated in FIG. 12. As will be understood, the optical fiber means 132 can conduct said reflected light to the photocell 80 for providing an electrical signal 82 corresponding to the amount of said reflected light. The solenoid valve 96 can then be operated through the switch 98 and relay 99 to project a stream of air 88 onto the patient's eye 50, thereby to distort the eye to an extent proportional to its intraocular pressure as at 104 in FIG. 13 in the manner previously described with reference to FIGS. 1–7. This distortion of the eye surface can cause some of the light 144 which had been reflected from the eye into the fiber means 132 to be randomly reflected as indicated by the arrows 144a in FIG. 13, so that the light is not received within said fiber means, thereby to modulate the signal 82 provided by the photocell 80 in accordance with the extent of said distortion. In this way, the apparatus 114 functions in a manner similar to the apparatus 10 for providing a signal 82 which is modulated in accordance with the patient's intraocular pressure.

It will be understood that appropriate display or recording devices such as those previously described can be arranged to be responsive to the signal 82 provided by the apparatus 114. It will also be understood that the relay 99 can be arranged to be responsive to the signal 82 for permitting the fluid stream 88 to be directed onto the patient's eye only when the apparatus 114 is properly oriented with said eye. It should also be noted that many other modifications of the apparatus 114 can be made within the teaching of this invention.

As can be seen, the methods provided by this invention can be very safely and conveniently employed for determining intraocular pressures. These methods do not require contacting of the patient's eye with any solid or rigid object and therefore can be employed without patient discomfort and without requiring the use of anesthetics or the like. In particular, the methods provided by this invention can be employed with such ease and safety that measurements of intraocular pressures can be regularly made by such methods as part of routine refractive eye examinations. As can also be seen, the apparatus provided by this invention can be of simple, compact, rugged and inexpensive instruction. The apparatus can also be very conveniently manipulated without requiring great skill on the part of the apparatus operator. Further, the apparatus does not require contact with the patient's eye and therefore cannot become clogged or contaminated by lacrymal fluids or the like and does not require sanitization before each use.

It can also be seen that many variations of the described methods and apparatus can be made without varying from the teaching of the present invention. Accordingly, it should be understood that this invention includes all modification and equivalents of the described methods which fall within the scope of the appended claims.

What is claimed is:

1. A method of tonometry comprising the steps of using at least one lens to focus light from a point light source at the center of curvature of the cornea of a patient's eye, projecting a stream of fluid from a predetermined position relative to said at least one lens and at a predetermind pressure onto said eye to distort the eye to an extent proportional to its intraocular pressure, and measuring the light reflected from said eye while said eye is distorted by said fluid stream relative to the light reflected when said eye is undistorted to determine said intraocular pressure.

2. A method of tonometry comprising the steps of using at least one lens to focus light from a first light source at the center of curvature of a patient's eye, projecting a stream of fluid from a predetermined position relative to said at least one lens and at a predetermined pressure onto said eye, directing light from a second light source fixed in position relative to the position from which said stream of fluid is projected onto the surface of said patient's eye, and measuring the light from said second light source reflected from said patient's eye while said stream of fluid is projected onto said eye relative to the light reflected when said stream of fluid is not projected onto said eye.

References Cited

UNITED STATES PATENTS

| 2,228,430 | 6/1942 | Bauman | 351—7 |
| 3,019,397 | 1/1962 | Crosby | 331—65 |
| 3,108,523 | 10/1963 | Nuchman et al. | 351—7 XR |
| 3,145,249 | 8/1964 | Meltzer | 88—1 |
| 3,181,351 | 5/1965 | Stauffer | 73—80 |
| 3,217,588 | 11/1965 | Chitayat | 88—1 |

RICHARD C. QUEISSER, Primary Examiner

J. P. BEAUCHAMP, Assistant Examiner